(12) United States Patent
Lin

(10) Patent No.: US 8,228,394 B2
(45) Date of Patent: Jul. 24, 2012

(54) APPARATUS AND METHOD FOR ADJUSTING THE DISPLAY DIRECTION OF AN IMAGE CAPTURED BY A CAMERA SYSTEM

(75) Inventor: Zheng-Gang Lin, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 536 days.

(21) Appl. No.: 12/412,383

(22) Filed: Mar. 27, 2009

(65) Prior Publication Data
US 2010/0039523 A1 Feb. 18, 2010

(30) Foreign Application Priority Data
Aug. 14, 2008 (CN) .......................... 2008 1 0303763

(51) Int. Cl.
| H04N 5/228 | (2006.01) |
| H04N 5/222 | (2006.01) |
| G06K 9/46 | (2006.01) |
| G06K 9/36 | (2006.01) |
| G06K 9/32 | (2006.01) |
| G06F 3/033 | (2006.01) |

(52) U.S. Cl. ............. 348/222.1; 348/208.3; 348/333.06; 382/190; 382/289; 382/296; 382/297; 345/158

(58) Field of Classification Search ............. 348/207.99, 348/207.1, 208.3, 65, 333.06, 208.99–208.16, 348/222.1, 36, E5.055; 345/158, 419; 382/190, 382/216, 289, 296, 297
See application file for complete search history.

(56) References Cited

U.S. PATENT DOCUMENTS

| 6,009,336 A * | 12/1999 | Harris et al. .................. 455/566 |
| 7,148,911 B1 * | 12/2006 | Mitsui et al. ............... 348/14.01 |
| 7,576,789 B2 * | 8/2009 | Miura ...................... 348/333.01 |
| 2005/0104848 A1 * | 5/2005 | Yamaguchi et al. .......... 345/156 |
| 2005/0122401 A1 * | 6/2005 | Horie ....................... 348/207.99 |
| 2005/0206736 A1 * | 9/2005 | Ng et al. .................... 348/208.7 |
| 2005/0212931 A1 * | 9/2005 | Gallagher et al. ............ 348/239 |
| 2006/0008172 A1 * | 1/2006 | Choi ............................ 382/254 |
| 2007/0065039 A1 * | 3/2007 | Park et al. .................... 382/275 |
| 2008/0044169 A1 * | 2/2008 | Wernersson .................... 396/50 |

* cited by examiner

Primary Examiner — Lin Ye
Assistant Examiner — Marly Camargo
(74) Attorney, Agent, or Firm — Altis Law Group, Inc.

(57) ABSTRACT

An image capture device includes an image detection unit, a display unit, and a control system. The image detection unit captures images of an object of which orientations can be detected. The display displays the captured images. The control system acquires the captured images, extracts features of the object, recognizes the orientations of the object, identifies an angle between the orientations and physical direction of the display unit, implements a corresponding command stored therein associated with the angle, and executes the corresponding command to adjust display direction of the display unit.

11 Claims, 6 Drawing Sheets

APPARATUS AND METHOD FOR ADJUSTING THE DISPLAY DIRECTION OF AN IMAGE CAPTURED BY A CAMERA SYSTEM

BACKGROUND

1. Technical Field

The disclosure relates to an image capture device capable of automatically adjusting display direction and a control method thereof.

2. Description of the Related Art

Rotation detection techniques are widely used in many electronic devices providing image capture function, such as mobile phones and digital still cameras. However, to provide rotation detection, additional chips such as gravity sensors are required, thereby increasing cost of the electronic devices.

Therefore, it is desirable to provide an image capture device and a control method thereof which can overcome the described limitations.

BRIEF DESCRIPTION OF THE DRAWINGS

Many aspects of the disclosure can be better understood with reference to the drawings. The components in the drawings are not necessarily drawn to scale, the emphasis instead being placed upon clearly illustrating the principles of the image capture device and control method. Moreover, in the drawings, like reference numerals designate corresponding parts throughout the views.

DETAILED DESCRIPTION OF THE EMBODIMENTS

Embodiments of the image capture device and control method are described in detail here with reference to the drawings.

Figure 1:
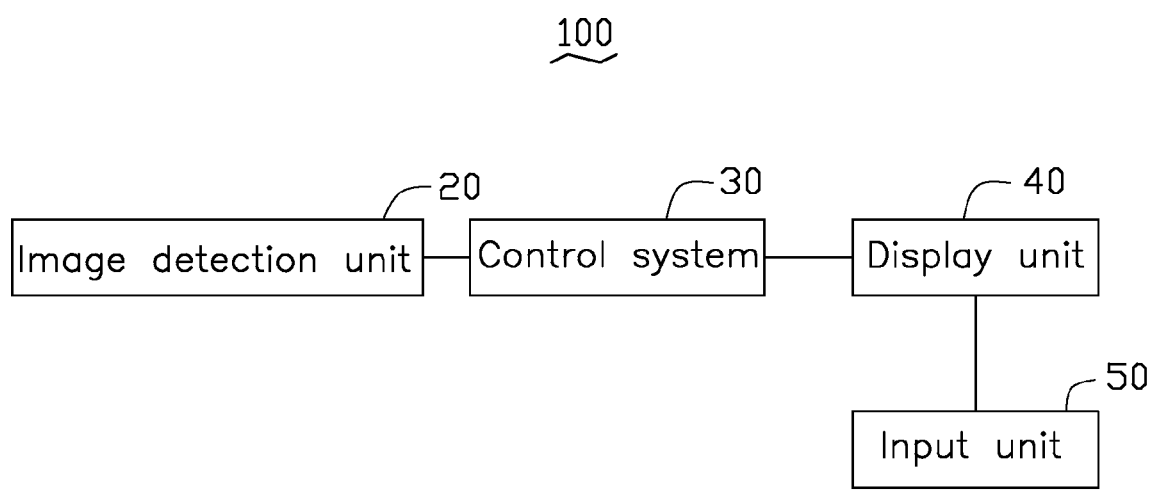
FIG. 1 is a block diagram of an image capture device, according to an exemplary embodiment.

As shown in FIG. 1, an image capture device 100 according to an exemplary embodiment includes an image detection unit 20, a control system 30, a display unit 40, and an input unit 50. As an example, the image capture device 100 is shown here as a camera, but can, alternatively, be any other image capture device, such as a cellular phone having a camera module.

The image detection unit 20 captures images of an object, the orientation of which is detected by analyzing the content of the captured images. For example, the captured images may include an object, the orientations of which, such as height, here, value M, can be detected (see FIG. 2 and below) by analysis. The image detection unit 20 may be an arrangement of a pickup lens and an image sensor, such as a charge-coupled device (CCD) image sensor or a complementary metal oxide semiconductor (CMOS) image sensor.

The input unit 50, such as a keypad, is configured to receive user input.

Figure 2:
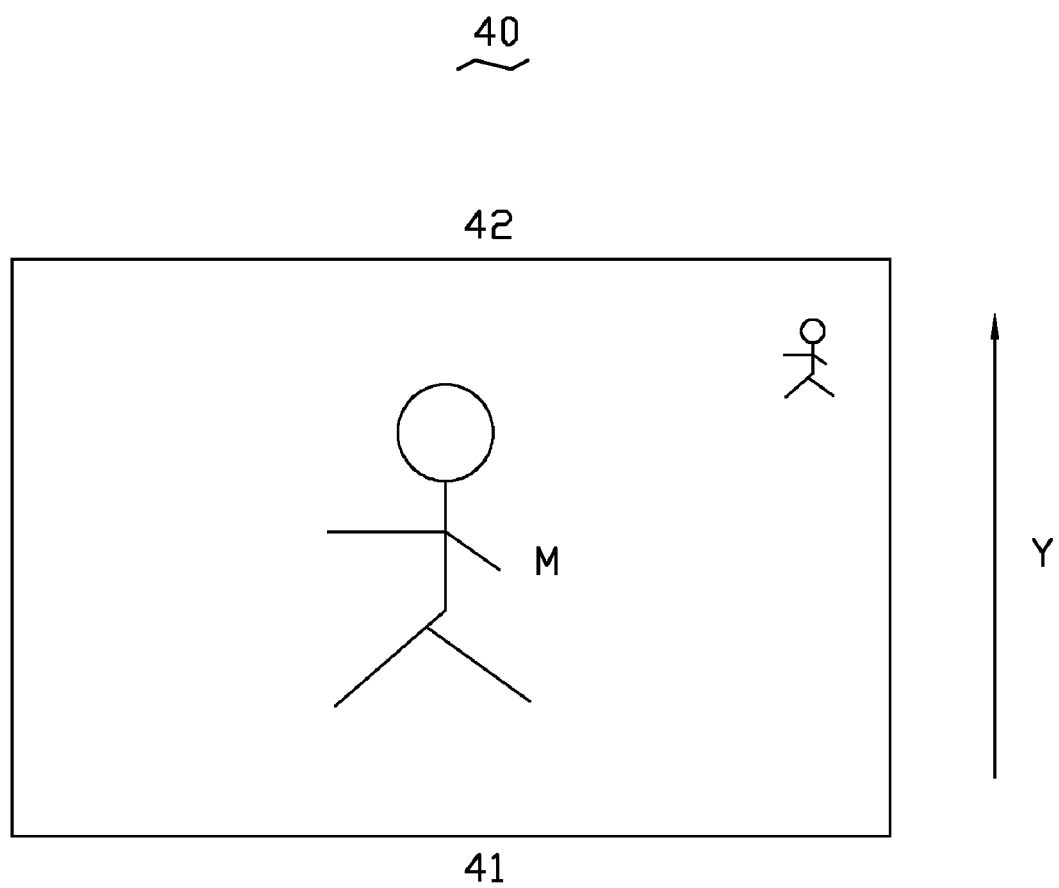
FIG. 2 shows an exemplary information display on the display unit of FIG. 1.

Referring to FIG. 2, the display unit 40, such as a liquid crystal display (LCD) panel, includes a bottom side 41 and a top side 42, and displays the captured images. For example, the display unit 40 and the input unit 50 can be integrated into a touch screen.

Figure 3:
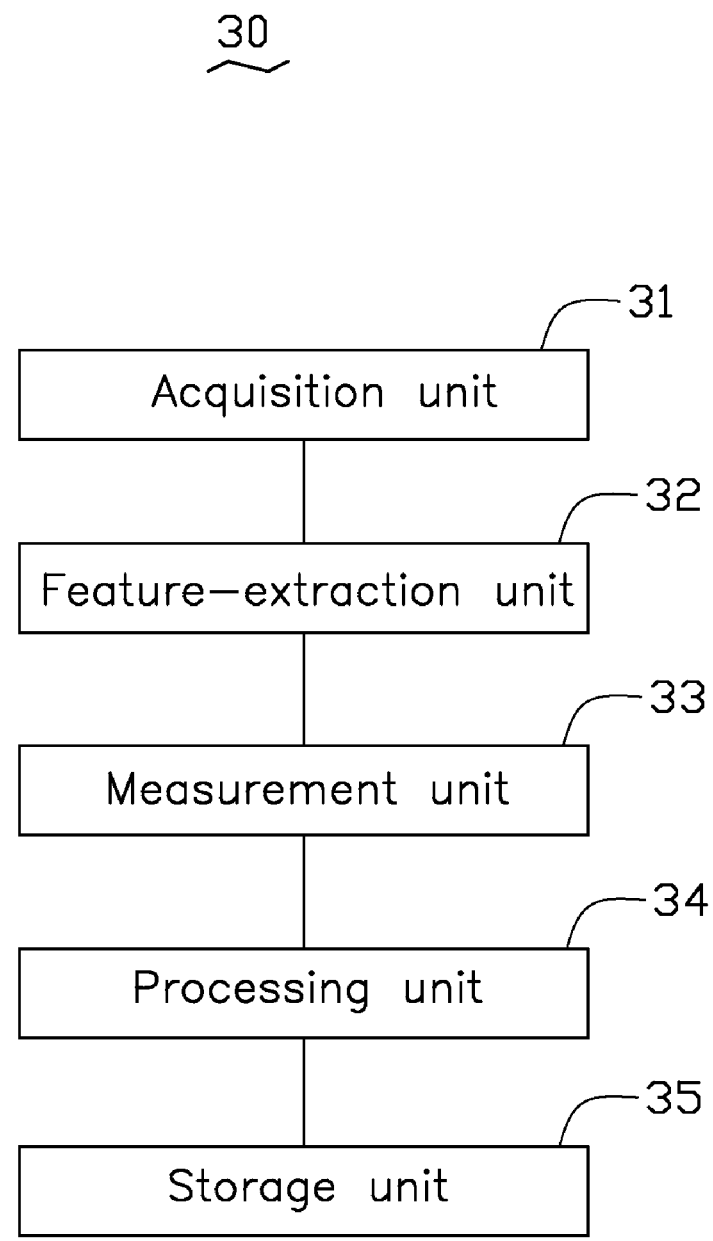
FIG. 3 is an exemplary block diagram of the control system of the image capture device of FIG. 1.

Referring to FIG. 3, the control system 30 includes an acquisition unit 31, a feature-extraction unit 32, a measurement unit 33, a processing unit 34, and a storage unit 35.

The acquisition unit 31 acquires the captured images from the image detection unit 20.

The feature-extraction unit 32 is configured to extract features of the object and thereby recognize the orientation of the object. Many detection algorithms such as support vector machine (SVM) by adopting luminance and chrominance low-level content features can be used by the feature-extraction unit 32. In this embodiment, the feature-extraction unit 32 can extract the height M of the scale object.

The measurement unit 33 is configured to measure the angle between the orientation and the physical directions of the display unit 40. For example, the measurement unit 33 can calculate an included angle between the extracted orientation, such as the height M of the scale object, and the physical direction Y of the display unit 40 (see FIG. 4).

Figure 4:
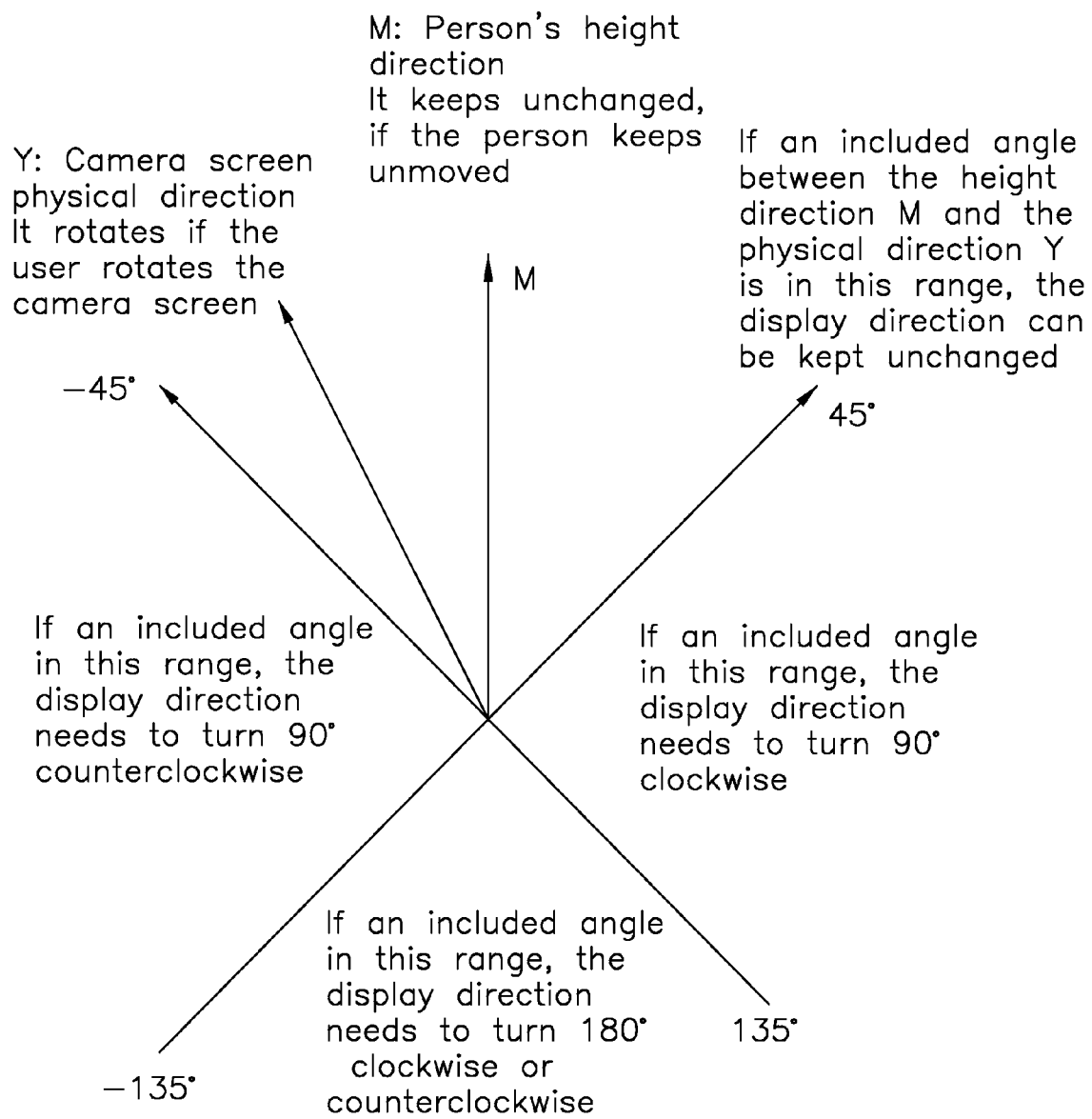
FIG. 4 is a schematic view showing a working principle of the control system of FIG. 3 according to an exemplary embodiment.
Figure 5:
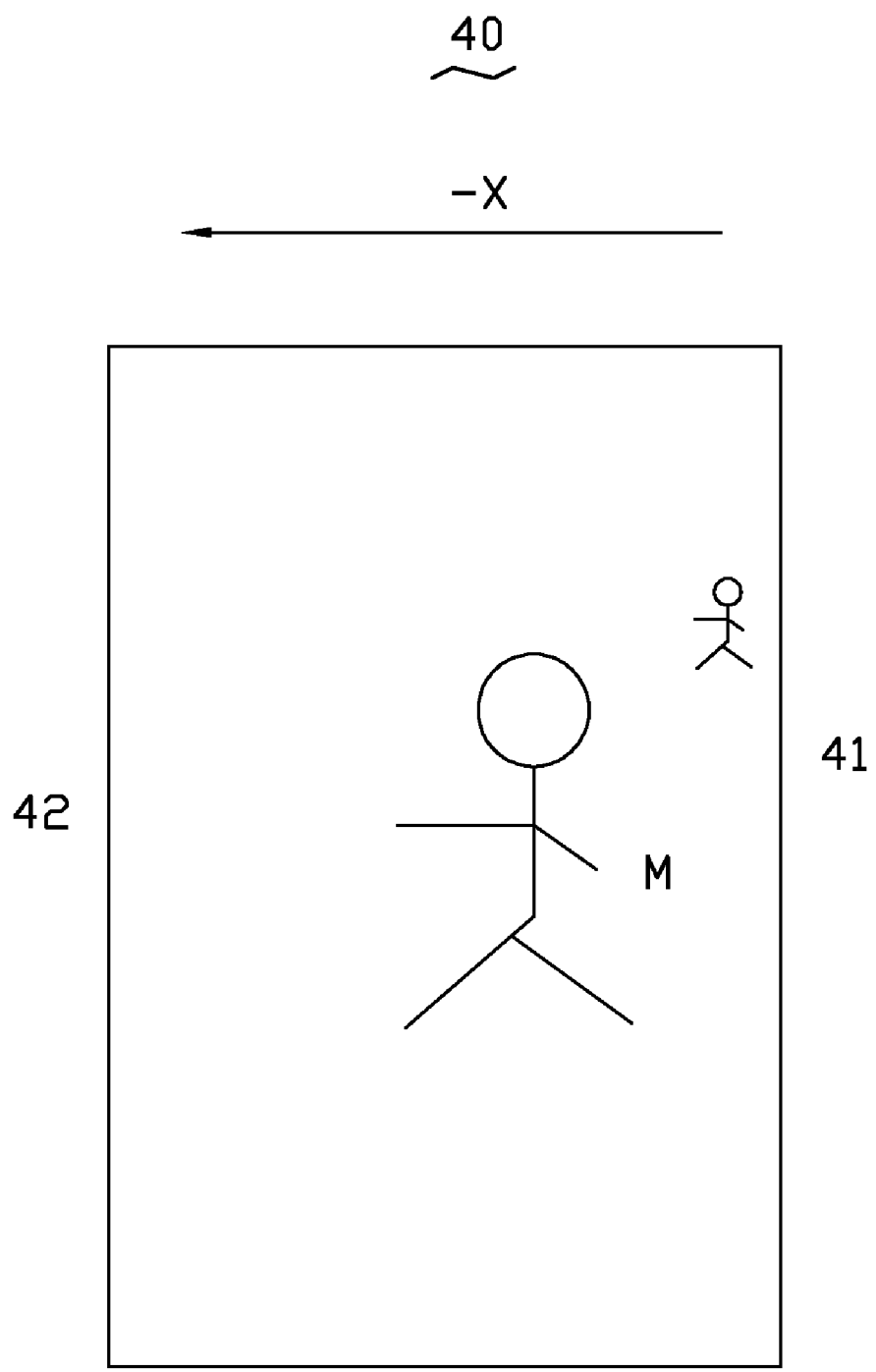
FIG. 5 is another exemplary information display on the display unit of FIG. 1.

The storage unit 35 stores software commands defining adjustment of the display direction of the display unit 40 based on the relationship between the orientation and the physical direction of the display unit 40. As shown in FIG. 4, for example, a first of these commands may define: if the included angle between the height M and the physical direction Y is in a range of $-45°\sim45°$, the display direction of the display unit 40 can remain unchanged; a second may define: if the included angle between the height M and the physical direction Y is in a range of $-135°\sim-45°$, the display unit 40 needs to rotate 90° counterclockwise (see FIG. 5); a third may define: if the included angle between the height M and the physical direction Y is in a range of $-135°\sim135°$, the display unit 40 needs to turn 180° counterclockwise or clockwise; and a fourth may define: if the included angle between the height M and the physical direction Y is in a range of $45°\sim135°$, the display unit 40 needs to turn 90° clockwise.

The processing unit 34 executes the software commands to adjust display direction of the display unit 40 for optimum view.

Figure 6:
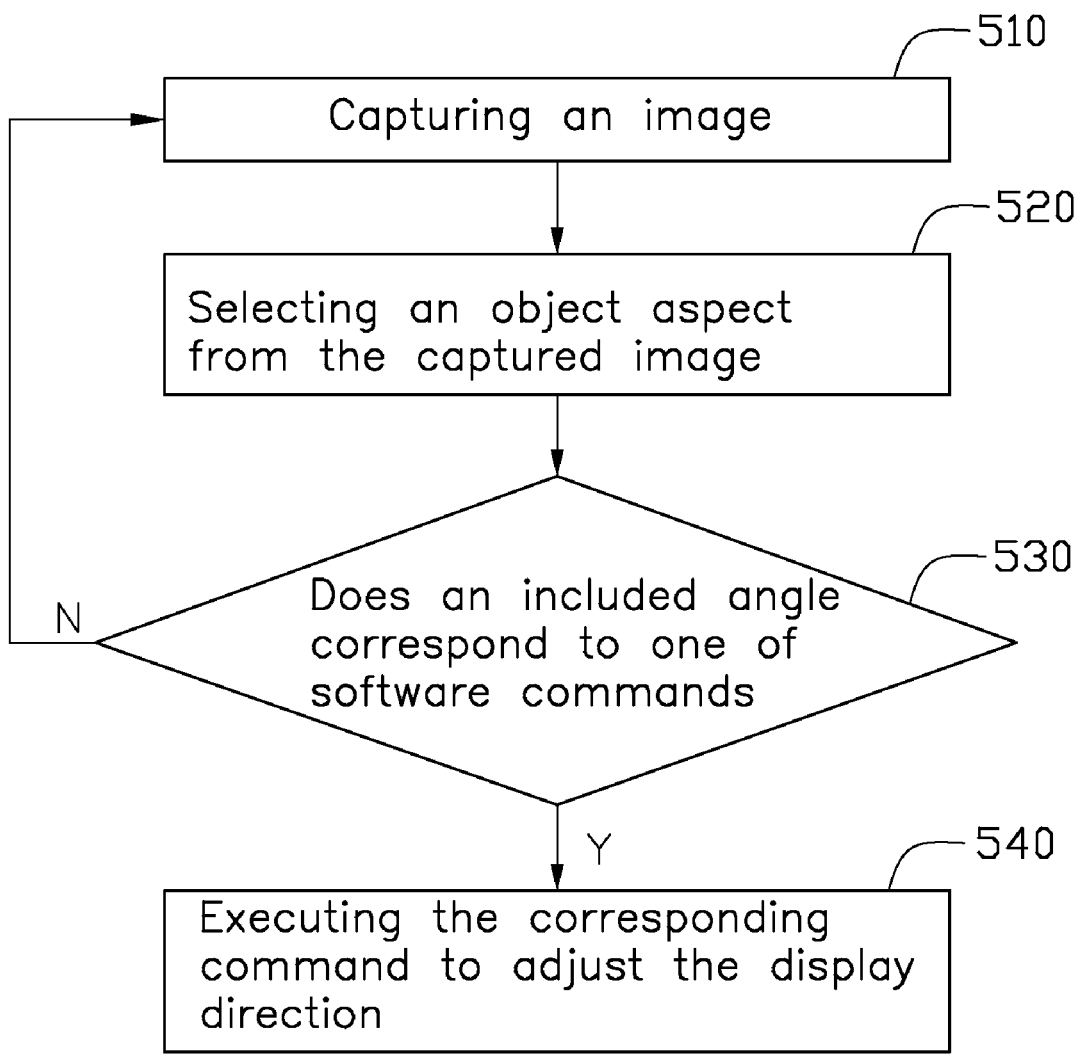
FIG. 6 is a flowchart of a control method of an image capture device, according to an exemplary embodiment.

FIG. 6 shows a control method which may be performed by, for example, the image capture device 100 of FIG. 1.

In step 510, an image is captured by the image detection unit 20.

In step 520, an object from the captured image is selected by the feature-extraction unit 32, and the orientation of the object determined.

In step 530, the measurement unit 33 determines whether the included angle between the orientation of the object and the physical direction of the display unit 40 requires implementation of corresponding software commands stored in the storage unit 35. If so, step 540 is executed. If not, step 510 is executed.

In step 540, the requisite software commands are executed to adjust the display direction of the display unit 40 to orient the object in a normal direction.

It is noted that the image capture device 100 can automatically adjust the display direction of the display unit 40 by analyzing the content of the captured images without the need for additional devices.

While the disclosure has been described by way of example and in terms of exemplary embodiment, it is to be understood that the disclosure is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An image capture device, comprising:
an image detection unit being configured for capturing images of an object;
a display unit being configured for displaying the captured images; and
a control system comprising
a feature extraction unit being configured for extracting the features of an object being imaged;
a processing unit; and
a storage unit for storing one or more commands executed by the processing unit, the one or more commands comprising:
acquire the captured image;
extract features of the object in the captured image and recognize an orientation of the object in the captured image;
measure an included angle between the orientation of the object and a physical direction of the display unit; and
leave a display direction of the display unit unchanged if the included angle is in range from −45° to 45°, rotate the display direction of the display unit 90° counterclockwise if the included angle is in range from −135° to −45°, rotate the display direction of the display unit 180° counterclockwise or clockwise if the included angle is in range from −135° to 135°, and rotate the display direction of the display unit 90° clockwise if the included angle is in range from 45° to 135°.

2. The image capture device of claim 1, further comprising an input unit configured for receiving user input.

3. The image capture device of claim 2, wherein the display unit and the input unit are integrated into a touch screen.

4. The image capture device of claim 1, wherein the image detection unit comprises an arrangement of a pickup lens and an image sensor.

5. The image capture device of claim 1, wherein the feature-extraction unit extracts features of the object via a support vector machine algorithm by adopting luminance and chrominance of the captured image.

6. The image capture device of claim 1, wherein the orientation of the object is an elongated direction of the object.

7. The image capture device of claim 1, wherein the physical direction of the display unit is a direction from a bottom side of the display unit to a top side of the display unit.

8. A control method for an image capture device, comprising:
capturing an image of an object;
extracting features of the object from the captured image and calculating the orientation of the object;
measuring an included angle or relationship between the orientation of the object and a physical direction of a display unit on which the captured image is displayed; and
executing a command by a processing unit corresponding to the identified relationship to leave a display direction of the display unit unchanged if the included angle is in range from −45° to 45°, rotate the display direction of the display unit 90° counterclockwise if the included angle is in range from −135° to −45°, rotate the display direction of the display unit 180° counterclockwise or clockwise if the included angle is in range from −135° to 135°, and rotate the display direction of the display unit 90° clockwise if the included angle is in range from 45° to 135.

9. The control method of claim 8, further comprising receiving user input to measure the angle.

10. The control method of claim 8, wherein the orientation of the object is an elongated direction of the object.

11. The control method of claim 8, wherein the physical direction of the display unit is a direction from a bottom side of the display unit to a top side of the display unit.

* * * * *